United States Patent [19]
Quagline

[11] Patent Number: 5,591,358
[45] Date of Patent: Jan. 7, 1997

[54] APPARATUS FOR CLAMPING AND LASER WELDING

[75] Inventor: James R. Quagline, Livonia, Mich.

[73] Assignee: Progressive Tool & Industries Co., Southfield, Mich.

[21] Appl. No.: 216,665

[22] Filed: Mar. 23, 1994

[51] Int. Cl.$^6$ .................................................. B23K 26/00
[52] U.S. Cl. ...................................................... 219/121.63
[58] Field of Search ..................... 219/121.63, 121.64, 219/121.67; 901/42

[56] References Cited

U.S. PATENT DOCUMENTS

| | | |
|---|---|---|
| 3,437,785 | 4/1969 | Sciaky . |
| 3,562,483 | 2/1971 | McMordie ................................ 219/89 |
| 4,128,753 | 5/1978 | Sharp . |
| 4,256,947 | 3/1981 | DeCandia . |
| 4,312,622 | 1/1982 | Favareto . |
| 4,352,003 | 7/1982 | Arnoldt ................................... 219/103 |
| 4,352,971 | 10/1982 | Slade ..................................... 219/86.61 |
| 4,392,601 | 7/1983 | Fujikawa et al. . |
| 4,400,607 | 8/1983 | Wakou et al. .......................... 219/86.8 |
| 4,404,451 | 7/1983 | Niikawa et al. ........................... 219/80 |
| 4,409,464 | 10/1983 | Favareto et al. . |
| 4,442,335 | 4/1984 | Rossi ......................................... 219/79 |
| 4,483,476 | 11/1984 | Fujikawa et al. . |
| 4,578,554 | 3/1986 | Coulter ................................. 219/121.63 |
| 4,596,502 | 6/1986 | Cattani . |
| 4,606,488 | 8/1986 | Yanagisawa . |
| 4,607,150 | 8/1986 | Bannister ................................. 901/42 |
| 4,626,999 | 12/1986 | Bannister ................................. 901/42 |
| 4,654,505 | 3/1987 | Sciaky et al. ........................ 219/121.63 |
| 4,658,110 | 4/1987 | Miller et al. . |
| 4,670,961 | 6/1987 | Fontaine et al. . |
| 4,681,396 | 7/1987 | Jones . |
| 4,691,905 | 7/1987 | Tamura et al. . |
| 4,698,483 | 10/1987 | Marinoni et al. .................... 219/121.63 |
| 4,719,328 | 1/1988 | Yanagisawa et al. . |
| 4,740,133 | 4/1988 | Kawano . |
| 4,761,533 | 8/1988 | Naruse et al. . |
| 4,779,787 | 10/1988 | Naruse et al. . |
| 4,813,587 | 3/1989 | Kadowaki et al. . |
| 4,831,228 | 5/1989 | Schumacher ......................... 219/86.51 |
| 4,847,467 | 7/1989 | Ausilio ................................. 219/121.63 |
| 4,906,812 | 3/1990 | Nied et al. . |
| 4,973,817 | 11/1990 | Kanno et al. ........................ 219/121.63 |
| 4,983,796 | 1/1991 | Griffaton . |
| 5,011,068 | 4/1991 | Stoutenburg et al. . |
| 5,036,175 | 7/1991 | Umeda ...................................... 219/89 |
| 5,064,991 | 11/1991 | Alborante ............................ 219/121.63 |
| 5,115,113 | 5/1992 | Miller ........................................ 219/89 |
| 5,115,115 | 5/1992 | Alborante ............................ 219/121.63 |
| 5,142,118 | 8/1992 | Schlatter ............................. 219/121.63 |
| 5,324,913 | 6/1994 | Oberg et al. ......................... 219/121.63 |

FOREIGN PATENT DOCUMENTS

| | | | |
|---|---|---|---|
| 1-180794 | 7/1989 | Japan ................................. 219/121.63 |
| 1-197092 | 8/1989 | Japan ................................. 219/121.63 |
| 1-192493 | 8/1989 | Japan ................................. 219/121.63 |
| 1438023 | 6/1976 | United Kingdom . |

*Primary Examiner*—Geoffrey S. Evans
*Attorney, Agent, or Firm*—Young & Basile, P.C.

[57] ABSTRACT

A clamping and welding apparatus for properly clamping and welding a pair of sheet materials within a welding station for both confined and accessible clamping and welding areas. When sheet materials or body panels of automobiles arrive in a welding station, the body panels typically have welding locations that are in both accessible and confined areas. In confined areas wherein the operation and maneuvering of the clamping and welding apparatus are hindered, a laser welder is connected to the end of a programmable robotic arm that provides a wide range of movement to the laser welder independent of a clamp. The clamp provides a pair of opposed clamp arms that are pivotally connected to a support member and whose pivotal movement is powered by a pair of clamp actuators units. An aperture is provided through one of the clamp arms to guide and direct the laser welder to a proper position for providing a spot weld on the body panels. When the welding location on the body panels is in an open and accessible area so that the operation and maneuvering of the clamping and welding apparatus is not hindered, the laser welder is fixedly mounted to the clamp so that the laser welder moves with the clamp arm. The laser welder is mounted outside the plane in which the clamp moves between a clamping position and unclamped position so that clogging does not occur.

42 Claims, 3 Drawing Sheets

APPARATUS FOR CLAMPING AND LASER WELDING

FIELD OF THE INVENTION

The present invention relates to clamping and welding apparatus and, more particularly, a clamping and welding apparatus that accurately and repeatedly clamps and welds at least two sheet materials together in both open and confined clamping and welding areas.

BACKGROUND OF THE INVENTION

Welding is commonly employed as an assembly method for joining several metal parts or sheet materials together into an assembly. Various welding methods are available, such as arc and resistant spot welding.

Recently, laser welding has been developed and has provided several advantages over more conventional forms of welding. The sharp focusing of the laser beam allows a concentration of energy capable of providing faster welding with less heat being introduced into the surrounding portions of the parts. Laser welding is also an extremely precise and accurate process, and once the metal sheet materials are properly clamped, repeatability on a production basis becomes a concern. In mass production laser welding operations, the precision with which the laser beam must be focused frequently greatly exceeds the degree of precision possible in positioning the sheet metal parts to be welded. Variances created in manufacturing tolerances, clamping fixture tolerances, and the tolerances within the parts themselves can all introduce errors in positioning the metal sheets relative to the laser beam focusing head which are many times greater than the maximum permissible variation of position relative to the point at which the laser beam is focused. Even programmable robotic arms are programmed with reference to a fixed origin and, therefore, cannot compensate for the tolerances created in the system. Without some form of guidance to compensate for the tolerances built within the system, accurate and repeatable positioning of the welds cannot be obtained.

Attempts have been made to remedy the problem by fixedly mounting the laser welder through an aperture in the clamping region of the clamp. This ensures that the metal sheets are clamped together in continuous contact while also ensuring for the proper positioning of the laser welder. Unfortunately, after a certain amount of use, the aperture in the clamp may become clogged, thus prohibiting the laser welder from providing a high quality weld. The clogging of the aperture in the clamp creates inefficiencies in manufacturing that are undesirable on a production basis.

Although laser welding has many applications, it is particularly well suited for production line welding of sheet metal body panels of an automobile. Typically, the body panels are loosely assembled and transported to a welding station. At the welding station, a clamping system is imposed to hold the body panels while the welding operations are performed.

Due to the configuration of the body panels, certain clamping and welding apparatus cannot be utilized in certain areas of the body panels as space limitations may limit the amount of space available for the necessary maneuvering and the proper functioning of the clamping and welding apparatus. Therefore, in order to maximize productivity and efficiency, several different configurations of clamping and welding apparatus must be utilized within one welding station depending on the configuration, speed and cost of the clamping and welding apparatus.

SUMMARY OF THE INVENTION

The present invention solves the above problems by providing a welding and clamping apparatus that when in a confined location, provides a laser welder attached to the end of a programmable robotic arm that cooperatively engages a clamping means to provide an accurate laser weld, and when in an accessible location, the present invention fixedly mounts the laser welder through an aperture provided in the clamping means in order to provide a fast, high quality laser weld.

When the clamping and welding areas are in confined areas wherein operation and maneuvering of the clamping and welding apparatus are hindered, the laser welder and programmable robotic arm may be utilized in conjunction with a plurality of clamping means. The clamping means moves between a clamped position, wherein at least two sheet materials are held in continuous contact, and an unclamped position, wherein the sheet materials are released for loading and unloading. A means for powering movement of the clamping means is provided for moving the clamping means between the clamped position and the unclamped position. An aperture is provided in the clamping means and is utilized to guide the laser welder to the proper location for laser welding the sheet materials. Due to the laser welder moving in and out of the aperture of the clamping means, the chances of the aperture becoming clogged are greatly reduced. The aperture helps to guide the laser welder to the proper welding location thus compensating for any increases in tolerances which may have accumulated in the system.

In accessible areas wherein operation and maneuvering of the clamping and welding apparatus is not hindered, the laser welder is fixedly mounted to the clamping means and extends through an aperture provided in the clamping means. The laser welder is positioned outside the plane in which the clamping means moves between the clamped position and the unclamped position. The clamping means portion defining the apertures is elevated from the sheet materials. Since the laser welder is not surrounded by a frame structure at or near the point of welding, no buildup or clogging occurs around the laser welder. Having the laser welder connected to the clamping means reduces cycle time but requires a separate laser welder for each clamping means.

To this end, the object of the present invention is to provide a new and improved clamping and welding apparatus that accurately and repeatedly clamps and laser welds sheet materials in both open and confined clamping and welding areas.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
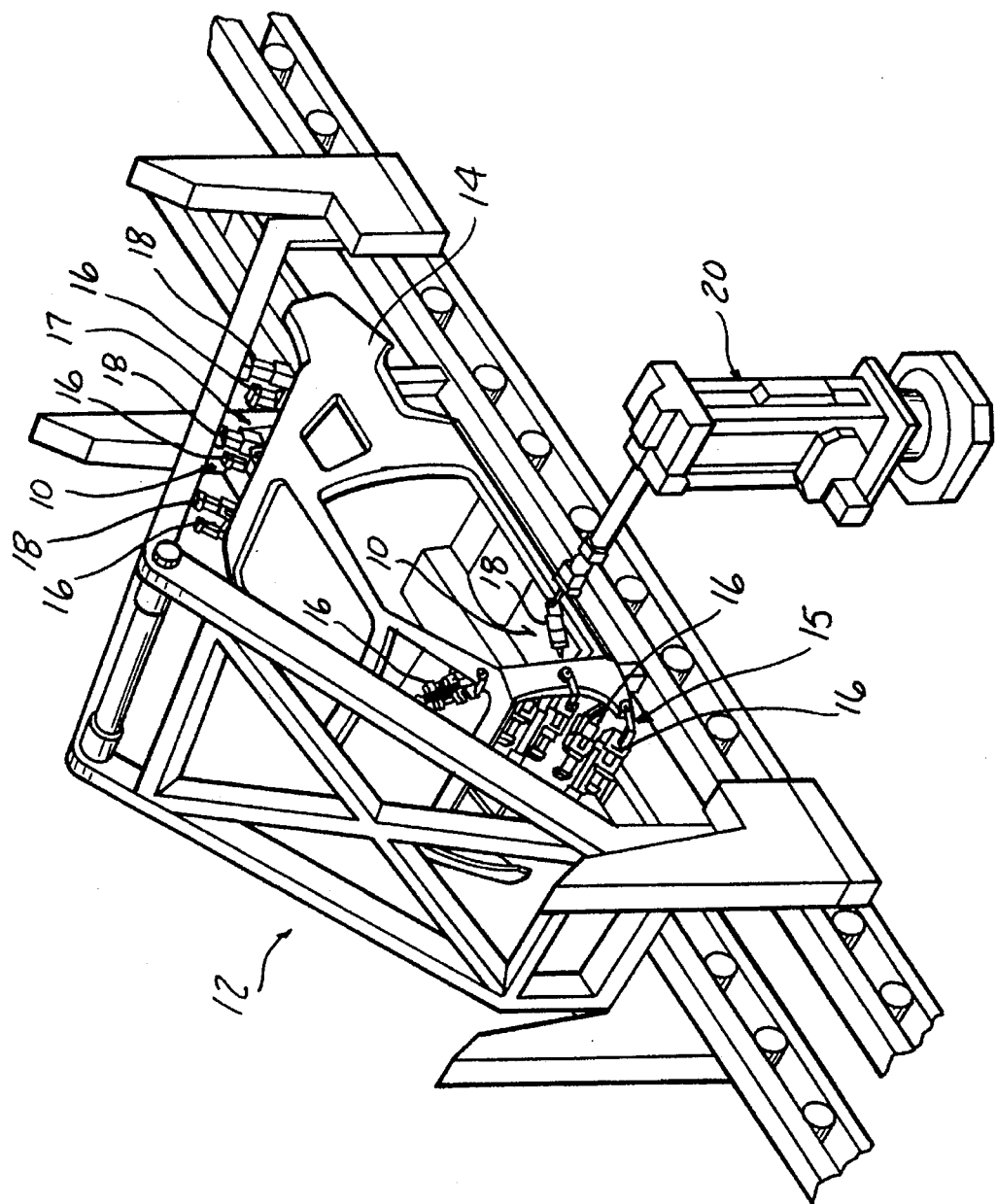
FIG. 1 is a schematic drawing of a welding station showing the clamping and welding apparatus of the present invention being utilized for both accessible and confined welding areas.

FIG. 1 shows the clamping and welding apparatus 10 of the present invention being utilized within a welding station 12 to perform a plurality of spot welding operations on at least two sheets of material, such as body panels 14 of an automobile. The body panels 14 are loosely assembled prior to entering the welding station 12, and the body panels 14 are properly aligned and held in position by a plurality of clamping means. Due to the configurations required of such automobile body panels 14, some of the welding locations are confined and difficult to access with the clamping and welding apparatus 10, yet other clamping and welding areas are open and do not hinder the operation and maneuvering of the clamping and welding apparatus 10.

For confined clamping and welding areas 15 within the body panels 14, the present invention provides first means for welding including a plurality of clamps 16 utilized in conjunction with a conventional laser welder 18 connected to a conventional programmable robotic arm 20. The laser welder 18 moves from clamp 16 to clamp 16 and cooperatively engages the clamps 16 to complete the necessary spot welds. This increases the cycle time to complete all of the welding operations at the welding station 12 but only requires the use of one laser welder 18 and one robotic arm 20 for several spot welding operations.

For open clamping and welding areas 17, second means for welding is employed which the laser welder 18 is mounted fixedly to the clamp 16 wherein the operation and maneuvering of the clamping and welding apparatus 10 is not hindered. This reduces the cycle time required to complete the welding operations at the welding station 12 but requires a separate laser welder 18 for each clamp 16. By strategically locating the proper clamping and welding apparatus 10 for the proper location within the welding station 12, maximum efficiency regarding cost, time and quality may be obtained.

Figure 2:
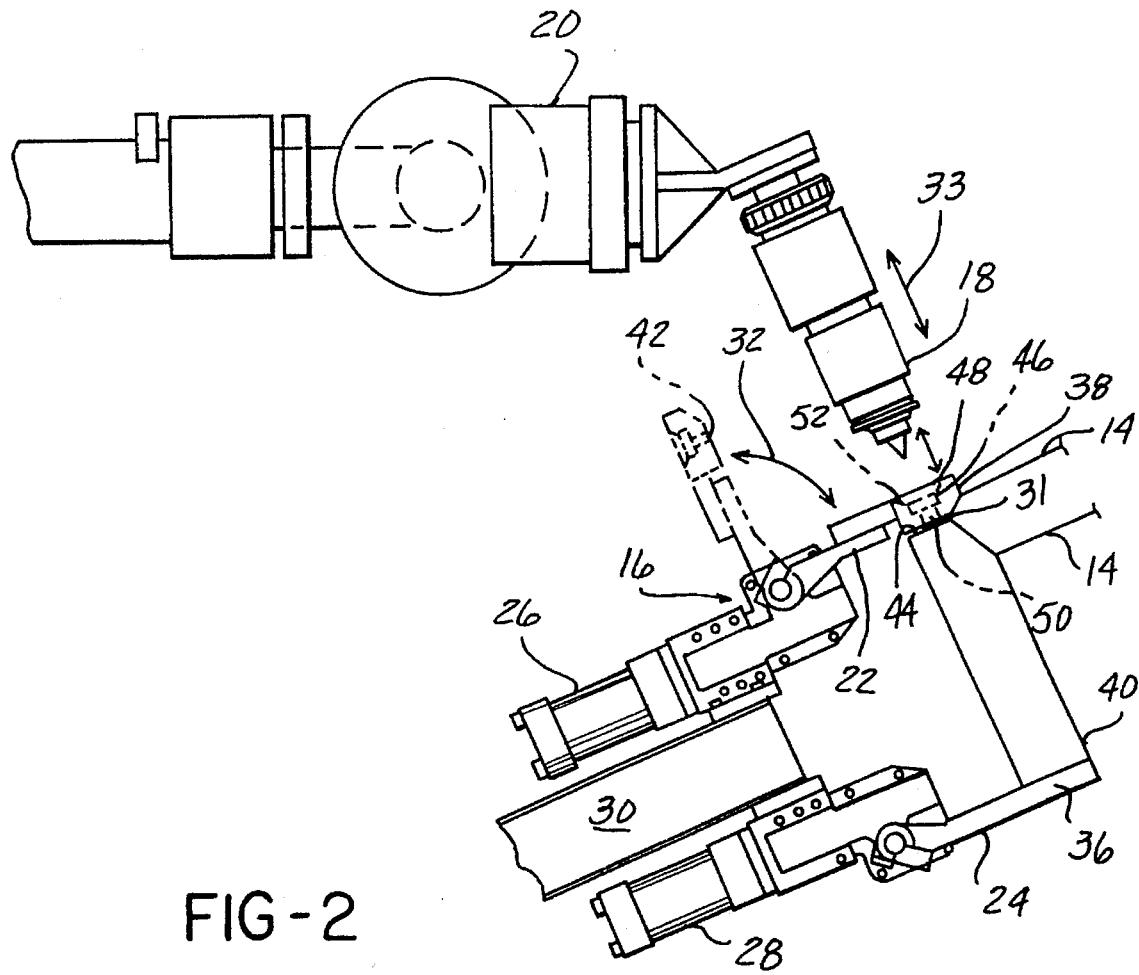
FIG. 2 is a side view showing the laser welder connected to a programmable robotic arm and showing the laser welder cooperatively engaging the clamp.

As mentioned above, for confined clamping and welding areas 15 within the configuration of the body panels 14, the laser welder 18 is mounted on the end of the programmable robotic arm 20 which provides the laser welder 18 with a wide range of movement independent of the clamp 16, as seen in FIG. 2. The programmable robotic arm 20 may be programmed to move between a plurality of clamps 16 so that a plurality of spot welding operations may be completed by the same laser welder 18. The robotic arm 20 may also reach locations in which a laser welder 18 fixedly connected to a clamp 16 cannot reach and operate efficiently.

The laser welder 18 on the robotic arm 20 cooperatively engages the clamp 16 which provides two opposing clamp arms 22, 24 that are each pivotally connected to and driven by a clamp actuator 26, 28, respectively. Each clamp actuator 26, 28 is connected to opposite sides of a support member 30. The clamp actuators 26, 28 power pivotal movement of the clamp arms 22, 24 between an unclamped position, wherein the body panels 14 are not engaged by the clamp arms 22, 24 thereby allowing the body panels 14 to be loaded and unloaded into and from the clamp 16, and a clamped position, wherein the opposing clamp arms 22, 24 apply opposing forces to the body panels 14 to place the abutting portions 31 of the body panels 14 in continuous contact with one another for proper spot welding. When moving between an unclamped and clamped position, the clamp arms 22, 24 pivot in a clamp actuating plane 32.

The clamp arms 22, 24 are substantially L-shaped with the end of the longer leg 34, 36, respectively, of the L-shape clamp arm 22, 24 being pivotally connected to the clamp actuator 26, 28, respectively. The shorter legs 38, 40 of the L-shaped clamp arms 22, 24, respectively, extend inward toward each other so that the end walls, or clamping surfaces 42, 44, of the shorter legs 38, 40, respectively, almost abut one another when in the clamped position. The distance between the clamping surfaces 42, 44 should be such that when the body panels 14 are loaded into the clamp 16, the clamp 16 applies enough force to the body panels 14 to maintain continuous contact and proper alignment of the body panels 14 during the spot welding process.

In another embodiment, one of the clamp arms 24 of the clamp 16 may be a stationary support (not shown) instead of a pivotal clamp arm 24. The stationary support may be rigidly connected to the support member 30, or the stationary support may be rigidly connected to an independent frame structure (not shown). The stationary support opposes the forces applied by the clamp arm 22 on the body panels 14 by having a portion of the body panels 14 placed between the clamp arm 22 and the stationary support.

To guide and direct the laser welder 18 when moving along line 33 to and from the proper welding position, the laser welder 18 cooperatively engages the clamp 16 through an aperture 46 provided through the short leg 38 of one 22 of the clamp arms 22, 24 within the clamp actuating plane 32. The aperture 46 has a larger opening 48 at one end of the shorter leg 38 of the L-shaped clamp arm 22 and extends through to a smaller opening 50 in the opposite side or clamping surface 42 of the short leg 38 of the clamp arm 22. Starting at the larger opening 48 of the aperture 46, a portion 52 of the aperture 46 is funnel shaped so that the laser welder 18 engages the larger opening 48 of the aperture 46 and is guided into the aperture 46 by its funnel-shaped portion 52 and is inserted into the aperture 46 by the programmable robotic arm 20. The aperture 46 has a mating configuration with the laser welder 18 so that the laser welder 18 mates with the aperture 46 to provide proper positioning of the laser welder 18 for spot welding the body panels 14. This helps to eliminate the effect of the accumulation of tolerances in the system. The smaller opening 50 provided in the clamping surface 42 provides the laser welder 18 with access to the spot welding locations on the body panels 14.

Figure 4:
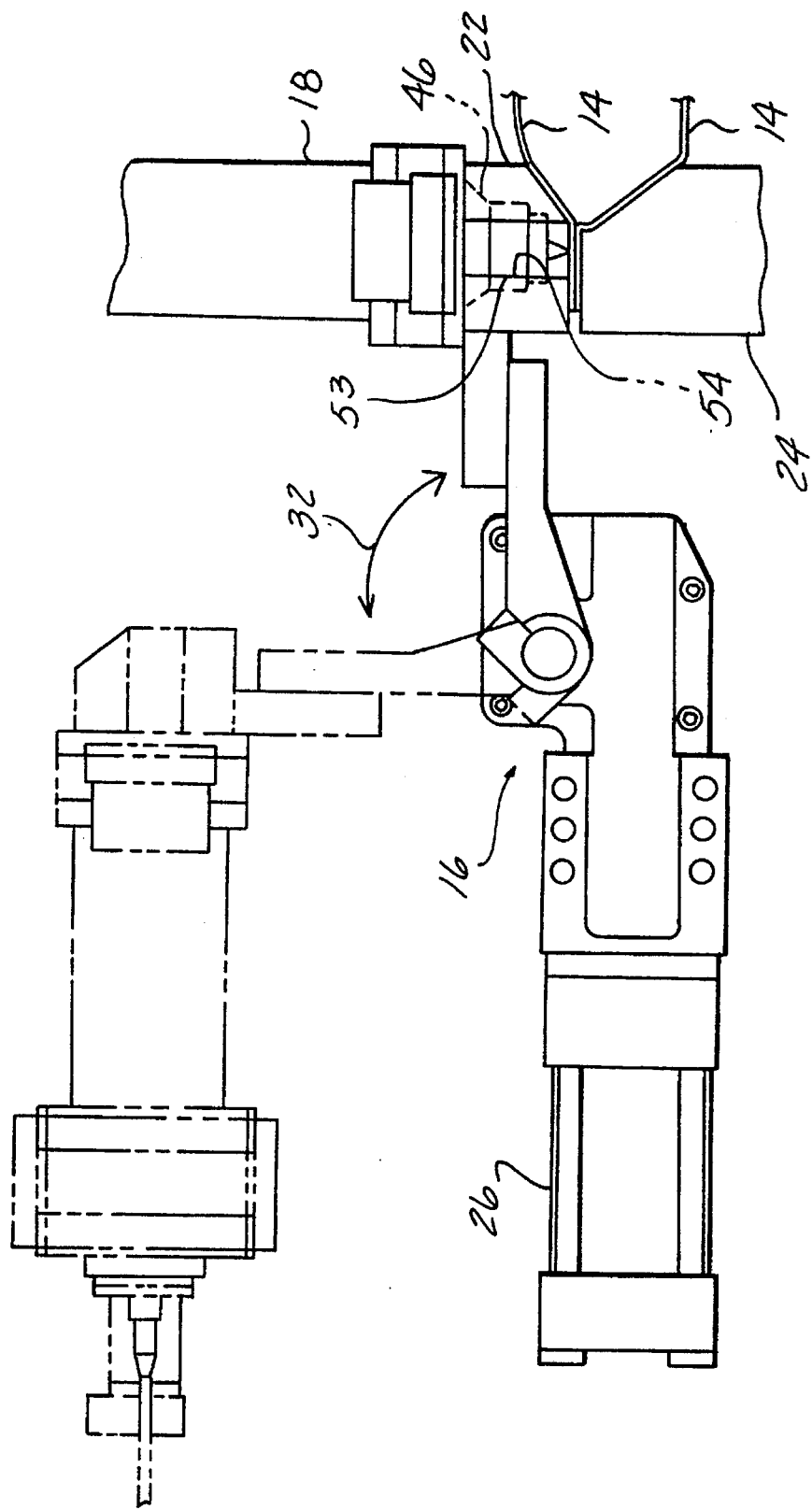
FIG. 4 is a side view showing the laser welder fixedly mounted within the aperture provided in the clamp and within the clamp actuating plane in which the clamp moves.

In yet another embodiment, the aperture 46 provided in the clamp arm 22 may be partially open or have a slot 53 extending therethrough, as seen in FIG. 4. In other words, the aperture 46 is not completely surrounded by side walls 54 of the clamp 16. Although clogging of the aperture 46 is typically not a problem when the laser welder 18 is moving in and out of the aperture 46, the aperture 46 may be partially opened should clogging occur.

Figure 3:
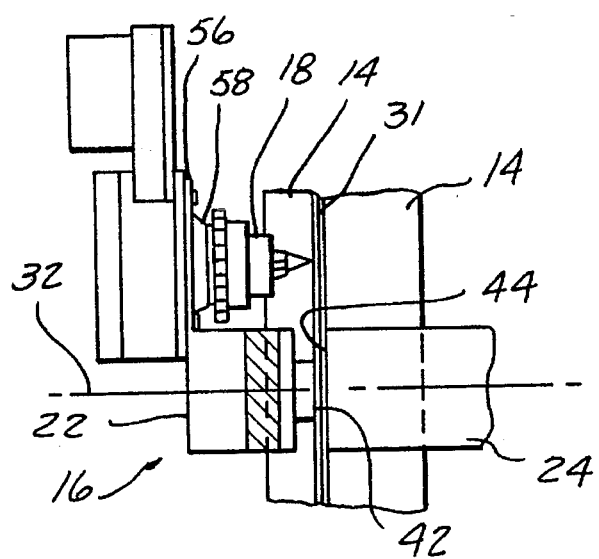
FIG. 3 is a front view showing the laser welder mounted through the aperture of the clamp and positioned outside the clamp actuating plane in which the clamp moves.

In an additional embodiment, the aperture 46 is located outside the clamp actuating plane 32, and the portion of the clamp 16 defining the aperture 46 is elevated to place a greater distance between the clamp 16 and the body panels 14 at the welding location, similar to FIG. 3. By being outside the clamp actuating plane 32, the laser welder 18 is located adjacent the clamping surface 42 when spot welding the body panels 14. By having the portion of the clamp 16 surrounding the laser welder 18 elevated, clogging around the laser welder 18 and aperture 46 is eliminated.

For the accessible clamping and welding areas 17 that do not hinder the operating and maneuvering of the clamping and welding apparatus 10, the laser welder 18 may be fixedly mounted to the clamp 16 since the clamp 16 and laser welder 18 have enough room to operate and move between the unclamped position and the clamped position, as seen in FIG. 3. The clamp 16 utilized for the accessible welding and clamping areas 17 is the same as the clamp 16 previously described, except the laser welder 18 is connected to a clamp extension 56 that extends outward from one 22 of the clamp arms 22, 24 thus moving with the clamp arm 22 parallel to the clamp actuating plane 32. The clamp extension 56 has an aperture 58 extending therethrough instead of the aperture 46 in the clamp arm 22 in which a portion of the laser welder 18 extends through. The clamp extension 56 is elevated from the body panels 14 and outside the clamp actuating plane 32 so that clogging is completely eliminated. By mounting the laser welder 18 adjacent to the clamping surfaces 42, 44 of the clamp arms 22, 24, cycle time is decreased while still providing for excellent accuracy and repeatability.

In even another embodiment, the laser welder 18 may be fixedly mounted to the clamp arm 22 wherein the laser welder 18 is seated in the aperture 46 that extends through the clamp arm 22 within the clamp actuating plane 32, as seen in FIG. 4. This is similar to the embodiment utilized for confined clamping and welding areas 15, except the laser welder 18 is fixedly mounted to the clamp 16. Although clogging may be a problem, this embodiment provides excellent cycle times and repeatability of the welding operation.

In even yet another embodiment, the laser welder 18 is fixedly mounted within the aperture 46 in the clamp arm 22 within the clamp actuating plane 32, as seen in FIG. 4, but the aperture 46 is partially open or has a slot 53 extending therethrough. In other words, the aperture 46 is not completely surrounded by side walls 54 of the clamp 16. This reduces clogging of the aperture caused by the surrounding structure.

As previously mentioned when the body panels 14 enter the welding station 12, a plurality of spot welds are typically performed. When the welding locations are confined and difficult to access with the clamping and welding apparatus 10, the conventional laser welder 18 is connected to the conventional programmable robotic arm 20 which provides the laser welder 18 with a wide range of movement independent of the clamp 16. The clamp 16 is utilized at each of the confined locations of the body panels 14. The programmable robotic arm 20 moves the laser welder 18 from clamp 16 to clamp 16 to complete all of the welding operations that are located in confined and restricted areas within the body panels 14. The aperture 46 provided in the clamp arm 22 guides the laser welder 18 into the clamp 16 so as to compensate for any inaccuracies and tolerances created in the system. The use of one laser welder 18 with several clamps 16 decreases cycle time at the welding station 12 but reduces cost by only requiring one laser welder 18 in conjunction with a plurality of clamps 16.

For the accessible clamping and welding areas 17 within the body panels 14 wherein the clamping and welding apparatus 10 can freely operate and maneuver between the clamped position and the unclamped position, the laser welder 18 is connected directly to the clamp extension 56 of the clamp 16 so that the laser welder 18 moves with the clamp 16. The laser welder 18 extends through the aperture 58 in the clamp extension 56 wherein the clamp extension 56 is outside the clamp actuating plane 32 and is elevated from the body panels 14 to eliminate clogging. By having the laser welder 18 outside the clamp actuating plane 32, the laser welder 18 is adjacent to the clamping surface 42 to provide an accurate and repeatable spot weld in a relatively short cycle time. These advantages are in turn weighed against the cost of requiring one laser welder 18 with each clamp 16.

Although the present invention lends itself favorably to being utilized for spot welding applications, it should be noted that the present invention is not limited to spot welding, but rather may be utilized on any type of welding operation. It should also be noted that the present invention is not limited to the welding of automobile body panels, but rather, the present invention may be utilized on any weldable material such as, but not limited to, aluminum, magnesium, stainless steel, steel, zinc, etc..

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A clamping apparatus in combination with a laser welder wherein the laser welder is connected to a programmable robotic arm and wherein said laser welder is independent and separate from said clamping apparatus, the clamping apparatus comprising:

means for releasingly clamping the sheet materials, and said clamping means moving in a clamp actuating plane when moving between a clamped position, wherein said clamping means provides opposing forces to the sheet materials to hold the sheet materials in continuous contact for welding, and an unclamped position, wherein said clamping means releases the sheet materials so that the sheet materials may be loaded and unloaded into said clamping means; and means for defining an aperture within said clamping means wherein a side wall of said clamping means provides a sufficient amount of said side wall to receive and guide the laser welder to a proper location for welding the sheet materials, wherein said means for defining an aperture in said clamping means includes a cylindrical bore extending therethrough with a funnel-shaped opening such that a sufficient amount of said side wall is provided to receive and guide the laser welder to a proper location for welding the sheet materials.

2. The combination stated in claim 1, further comprising:

said independent laser welder having a light converging end, and said end having a periphery at least partially engaging within said aperture of said clamping apparatus.

3. The combination stated in claim 1 wherein said means for releasingly clamping comprises:

a support member independent of said robotic arm; and a pair of opposed clamp arms each supported by and pivotally connected to said support member for movement between said clamped position and said unclamped position.

4. The combination stated in claim 3 including means for powering pivotal movement of said clamp arms between said clamped position and said unclamped position.

5. The combination stated in claim 4 wherein said means for powering pivotal movement comprises a pair of clamp actuator units mounted to the support member and connected to said clamp arms for powering pivotal movement of said clamp arms between said clamped position and said unclamped position.

6. The combination stated in claim 1 wherein said means for releasingly clamping comprises:

a support member;

a clamp arm pivotally connected to said support member for movement between said clamped position and said unclamped position; and means for opposing the force applied by said clamp arm to the sheet materials when in the clamped position so that the sheet materials are held in continuous contact with one another between said clamp arm and said opposing means to provide proper positioning of the sheet materials for welding, and said clamp arm pivoting about said support member independent of said opposing means.

7. The combination stated in claim 6 wherein said means for opposing the force applied by said clamp arm comprises a stationary support that provides a positive stop against said sheet materials upon said clamp arm applying a force to the sheet materials.

8. The combination stated in claim 6 including means for powering pivotal movement of said clamp arm between said clamped position and said unclamped position.

9. The combination stated in claim 8 wherein said means for powering pivotal movement comprises a clamp actuator unit mounted to said support member and connected to said clamp arm for powering pivotal movement of said clamp arm between said clamped and unclamped position.

10. The combination stated in claim 1 wherein said means for defining an aperture is located within said clamp actuating plane.

11. The combination stated in claim 1 is wherein said side wall defines a slot extending therethrough and communicating with said bore such that a sufficient amount of side wall is provided to receive and guide the laser welder to a proper location for welding the sheet materials.

12. An apparatus for collecting and welding at least two sheet materials comprising:

means for releasingly clamping the sheet materials, said clamping means moving in a clamp actuating plane when moving between a clamped position, wherein said clamping means provides opposing forces to the sheet materials to hold the sheet materials in continuous contact for welding, and an unclamped position, wherein said clamping means releases the sheet materials so that the sheet materials may be loaded and unloaded into said clamping means;

means for welding the sheet materials; and means for defining an aperture in said clamping means, and said welding means extending through said aperture means and removeably connected to said clamping means, wherein a cylindrical bore extends through said clamping means forming a side wall of said clamping means and said side wall having a slot extending therethrough in communication with said bore so that a sufficient amount of said side wall is provided to receive and guide said welding means to a proper location for welding the sheet materials.

13. A clamping apparatus in combination with a laser welder wherein the laser welder is connected to an independent programmable robotic arm and wherein said laser welder is independent and separate from said clamping apparatus, the clamping apparatus comprising:

means for releasingly clamping the sheet materials, and said clamping means moving in a clamp actuating plane when moving between a clamped position, wherein said clamping means provides opposing forces to the sheet materials to hold the sheet materials in continuous contact for welding, and an unclamped position, wherein said clamping means releases the sheet material so that the sheet materials may be loaded and unloaded into said clamping means;

means for defining an aperture in said clamping means for receiving and guiding said independent laser welder to a proper location for welding the sheet materials wherein said means for defining an aperture is located outside of said clamp actuating plane.

14. An apparatus for clamping and welding at least two sheet materials comprising:

means for releasingly clamping the sheet materials, and said clamping means moving in a clamp actuating plane when moving between a clamped position, wherein said clamping means provide opposing forces to the sheet materials to hold the sheet materials in continuous contact for welding, and an unclamped position, wherein said clamping means releases the sheet materials so that the sheet materials may be loaded and unloaded into said clamping means;

means for welding the sheet materials;

means for defining an aperture in said clamping means, and said welding means extending through said aperture means and removeably connected to said clamping means; and said aperture defining means located outside of said clamp actuating plane.

15. The apparatus stated in claim 14 wherein said welding means comprises a laser welder.

16. The apparatus stated in claim 14, wherein said means for releasingly clamping comprises:

a support member; and a pair of opposing clamp arms pivotally connected to said support member for movement between said clamped position and said unclamped position.

17. The apparatus stated in claim 16 including means for powering pivotal movement of said clamp arms between said clamped position and said unclamped position.

18. The apparatus stated in claim 17 wherein said means for powering pivotal movement of said clamp arms comprises a pair of clamp actuator units mounted to said support member and connected to said clamp arms for powering pivotal movement of said clamp arms between said clamped position and said unclamped position.

19. The aperture stated in claim 14 wherein said means for releasingly clamping comprises:

a support member;

a clamp arm pivotally connected to said support member for movement between said clamped position and said unclamped position; and means for opposing the force applied by said clamp arm to said sheet materials when in the clamped position so that said sheet materials are held in continuous contact with one another between said clamp arm and said opposing means to provide proper positioning of the sheet materials for welding, said clamp arm pivots about said support member independent of said opposing means.

20. The apparatus stated in claim 19 wherein said means for opposing the force provided by said clamp arm comprises a stationary support that provides a positive stop against the sheet materials when said clamp arm applies a force to the sheet materials in said clamped position.

21. The apparatus stated in claim 19 including means for powering pivotal movement of said clamp arm between said clamped position and said unclamped position.

22. The apparatus stated in claim 21 wherein said means for powering pivotal movement comprises a clamp actuator unit mounted to said support member and connected to said clamp arm for powering pivotal movement of said clamp arm between said clamped position and said unclamped position.

23. A clamping apparatus in combination with a laser welder, the clamping apparatus comprising:

means for releasably clamping at least two sheet materials in continuous contact for welding by said laser welder;

said clamping means operative in a clamp actuating plane for movement between a clamped position, wherein said clamping means provides opposing forces to the sheet materials to hold the sheet materials in continuous contact for welding, and an unclamped position, wherein said clamping means releases the sheet materials so that the sheet materials may be loaded and unloaded into said clamping means; and means for defining an aperture within said clamping means, wherein said aperture defining means includes a side wall in said clamping means wherein a sufficient amount of said side wall is provided for receiving and guiding said laser welder to a proper position for welding said sheet materials, said side wall further defining a cylindrical bore extending through said clamping means wherein said cylindrical bore has a funnel shaped opening to receive and guide said laser welder, said side wall further defining a slot in communication with said bore for receiving and guiding said laser welder to a proper location for welding said sheet materials.

24. The combination stated in claim 23 wherein said laser welder is removeably connected to said clamping apparatus.

25. The combination in claim 23 wherein said laser welder is separate and independent from said clamping apparatus.

26. The combination in claim 23 wherein said aperture means is in said clamp actuating plane.

27. The combination as stated in claim 23 wherein said aperture means is outside said clamp actuating plane.

28. An apparatus for clamping and welding at least two sheet materials comprising:

a station for clamping and welding the sheet materials;

first means for releasingly clamping the sheet materials, and said clamping means moving in a clamp actuating plane when moving between a clamped position, wherein said clamping means provides opposing forces to the sheet materials to hold the sheet materials in the proper position for welding, and an unclamped position, wherein said clamping means releases the sheet materials so that the sheet materials may be loaded and unloaded into said clamping means;

first means for welding the sheet materials, said first welding means connected to a programmable robotic arm for providing a wide range of independent movement of said first welding means to engage the sheet materials located in confined clamping areas;

means for cooperatively engaging said first welding means with said first clamping means for guiding said first welding means to a proper location for welding the sheet materials;

second means for releasingly clamping the sheet materials, and said second clamping means moving in a second clamp actuating plane when moving between said clamped position and said unclamped position;

second means for welding the sheet materials located in open clamping areas; and means for defining an aperture in said second clamping means wherein said second welding means extends therethrough and is connected to said second clamping means.

29. The apparatus stated in claim 28 wherein said first and second means for releasingly clamping comprises:

a support member; and a pair of opposing clamp arms pivotally connected to said support member for movement between said clamped position and said unclamped position.

30. The apparatus stated in claim 29 including means for powering pivotal movement of said clamp arms between said clamped position and said unclamped position.

31. The apparatus stated in claim 30 wherein said means for powering pivotal movement of said clamp arms comprises a pair of clamp actuator units connected to said support member and said clamp arms for powering pivotal movement of said clamp arms between said clamped position and said unclamped position.

32. The apparatus stated in claim 28 wherein said means for cooperatively engaging said first welding means with said first clamping means comprises a means for defining an aperture in said first clamping means for receiving and guiding said first welding means to a proper position for welding the sheet material.

33. The apparatus stated in claim 32 wherein said first and second welding means comprise a laser welder.

34. The apparatus stated in claim 32 wherein said first and second means for releasingly clamping comprises:

a support member;

a clamp arm pivotally connected to said support member for movement between said clamped position and said unclamped position; and means for opposing the force supplied by said clamp arm to the sheet materials when in said clamped position so that the sheet materials are held in contact with one another between said clamp arm and said opposing means to provide proper positioning of the sheet materials for welding.

35. The apparatus stated in claim 34 wherein said means for opposing the force applied by said clamp arm comprises a stationary support that provides a positive stop against said sheet material upon said clamp arm applying a force to said sheet materials when in the clamped position.

36. The apparatus stated in claim 34 including means for powering pivotal movement of said clamp arm between said clamped position and said unclamped position.

37. The apparatus stated in claim 36 wherein said means for powering pivotal movement comprises a clamp actuator unit mounted to said support member and connected to said clamp arm for powering pivotal movement of said clamp arm between said clamped position and said unclamped position.

38. The apparatus stated in claim 32 wherein said means for defining an aperture in said first and second clamping means comprises a side wall of the clamp wherein a sufficient amount of said side wall is provided to receive and guide said first and second welding means to a proper location for welding the sheet materials.

39. The apparatus stated in claim 38 wherein said side wall of the clamp comprises a cylindrical bore extending therethrough such that a sufficient amount of said side wall is provided to receive and guide the first and second welding means to a proper location for welding the sheet materials.

40. The apparatus stated in claim 39 wherein said cylindrical bore includes a slot extending therethrough such that a sufficient amount of said side wall is provided to receive and guide the first and second welding means to a proper location for welding the sheet materials.

41. The apparatus stated in claim 32 wherein said means for defining an aperture in said first clamping means is located within said clamp actuating plane, and said means for defining an aperture in said second clamping means is located outside of said clamp actuating plane.

42. The apparatus stated in claim 32 wherein said means for defining an aperture is disposed within said first and second clamping means and is within said clamp actuating plane.

\* \* \* \* \*